United States Patent
Hammonds

(10) Patent No.: US 11,428,365 B1
(45) Date of Patent: Aug. 30, 2022

(54) ADJUSTABLE DISPLAY TRACK SYSTEM

(71) Applicant: Stephen Hammonds, Mount Pleasant, NC (US)

(72) Inventor: Stephen Hammonds, Mount Pleasant, NC (US)

(*) Notice: Subject to any disclaimer, the term of this patent is extended or adjusted under 35 U.S.C. 154(b) by 0 days.

(21) Appl. No.: 17/307,042

(22) Filed: May 4, 2021

(51) Int. Cl.
| | |
|---|---|
| *F16M 13/02* | (2006.01) |
| *B61B 3/00* | (2006.01) |
| *F16M 11/12* | (2006.01) |
| *F16M 11/10* | (2006.01) |
| *F16M 11/18* | (2006.01) |
| *B61B 9/00* | (2006.01) |

(52) U.S. Cl.
CPC ............ *F16M 13/022* (2013.01); *B61B 3/00* (2013.01); *B61B 9/00* (2013.01); *F16M 11/10* (2013.01); *F16M 11/126* (2013.01); *F16M 11/18* (2013.01)

(58) Field of Classification Search
CPC .... F16M 13/022; F16M 11/10; F16M 11/126; F16M 11/18; B61B 3/00; B61B 9/00
USPC ....................................................... 248/550
See application file for complete search history.

(56) References Cited

U.S. PATENT DOCUMENTS

| | | | |
|---|---|---|---|
| 6,739,096 B2 | 5/2004 | Feldpausch | |
| D528,901 S | 9/2006 | David | |
| 7,377,475 B1* | 5/2008 | Lopez | F16M 11/18 105/29.2 |
| 7,793,907 B2 | 9/2010 | Woodward | |
| 9,163,783 B1 | 10/2015 | McLaughlin | |
| 10,337,667 B2* | 7/2019 | Matthews | F16M 11/045 |
| 2014/0034802 A1* | 2/2014 | Robbins | F16M 11/425 248/323 |
| 2016/0037924 A1* | 2/2016 | Bromley | A47B 97/001 248/287.1 |

FOREIGN PATENT DOCUMENTS

WO 1992018037 10/1992

* cited by examiner

*Primary Examiner* — Muhammad Ijaz
(74) *Attorney, Agent, or Firm* — Kyle A. Fletcher, Esq.

(57) ABSTRACT

The adjustable display track system comprises a track and a roller car. The adjustable display track system may be adapted to move a flat screen display that is coupled to the roller car along the track between a lowered position and a raised position. The adjustable display track system may be adapted to lower an elevation angle of the flat screen display as the roller car is raised such that the flat screen display continues to point towards a user. Motion of the roller car may be controlled remotely from a smart device.

17 Claims, 7 Drawing Sheets

ADJUSTABLE DISPLAY TRACK SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of display stands, more specifically, an adjustable display track system.

SUMMARY OF INVENTION

The adjustable display track system comprises a track and a roller car. The adjustable display track system may be adapted to move a flat screen display that is coupled to the roller car along the track between a lowered position and a raised position. The adjustable display track system may be adapted to lower an elevation angle of the flat screen display as the roller car is raised such that the flat screen display continues to point towards a user. Motion of the roller car may be controlled remotely from a smart device.

An object of the invention is to support a flat screen display on a roller car that is movably coupled to a track.

Another object of the invention is to move the roller car along the track using a lifting cable that winds and unwinds from a motorized spool such that the flat screen display is raised or lowered.

A further object of the invention is to provide a curved track mounted between a wall and a ceiling such that the elevation angle of the flat screen display is lowered as the display is raised.

Yet another object of the invention is to provide a wireless interface between a smart device in the possession of a user and a controller within the track such that the roller car may be moved from a remote location.

These together with additional objects, features and advantages of the adjustable display track system will be readily apparent to those of ordinary skill in the art upon reading the following detailed description of the presently preferred, but nonetheless illustrative, embodiments when taken in conjunction with the accompanying drawings.

In this respect, before explaining the current embodiments of the adjustable display track system in detail, it is to be limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the adjustable display track system.

It is therefore important that the claims be regarded as including such equivalent construction insofar as they do not depart from the spirit and scope of the adjustable display track system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
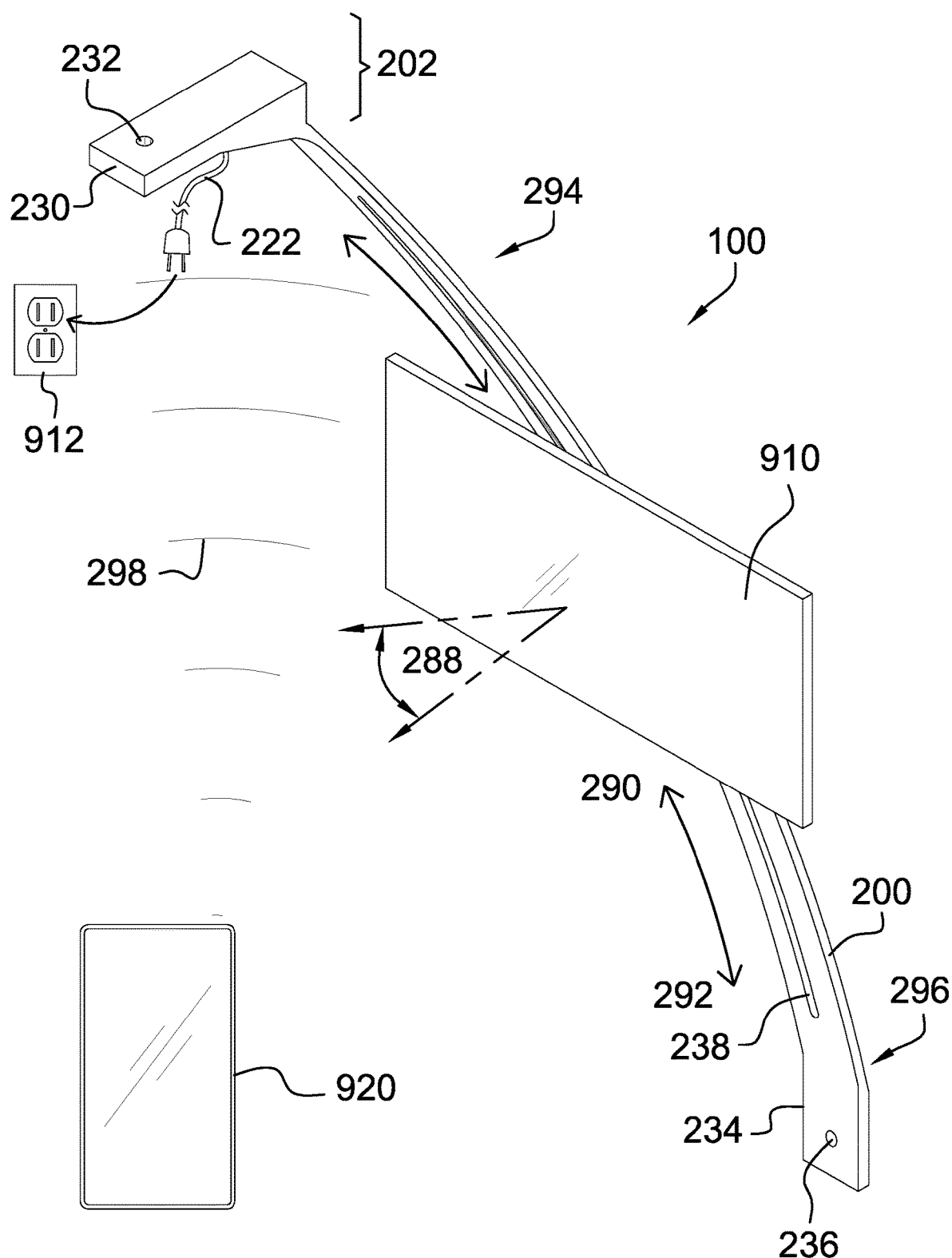
FIG. 1 is an isometric view of an embodiment of the disclosure.
Figure 2:
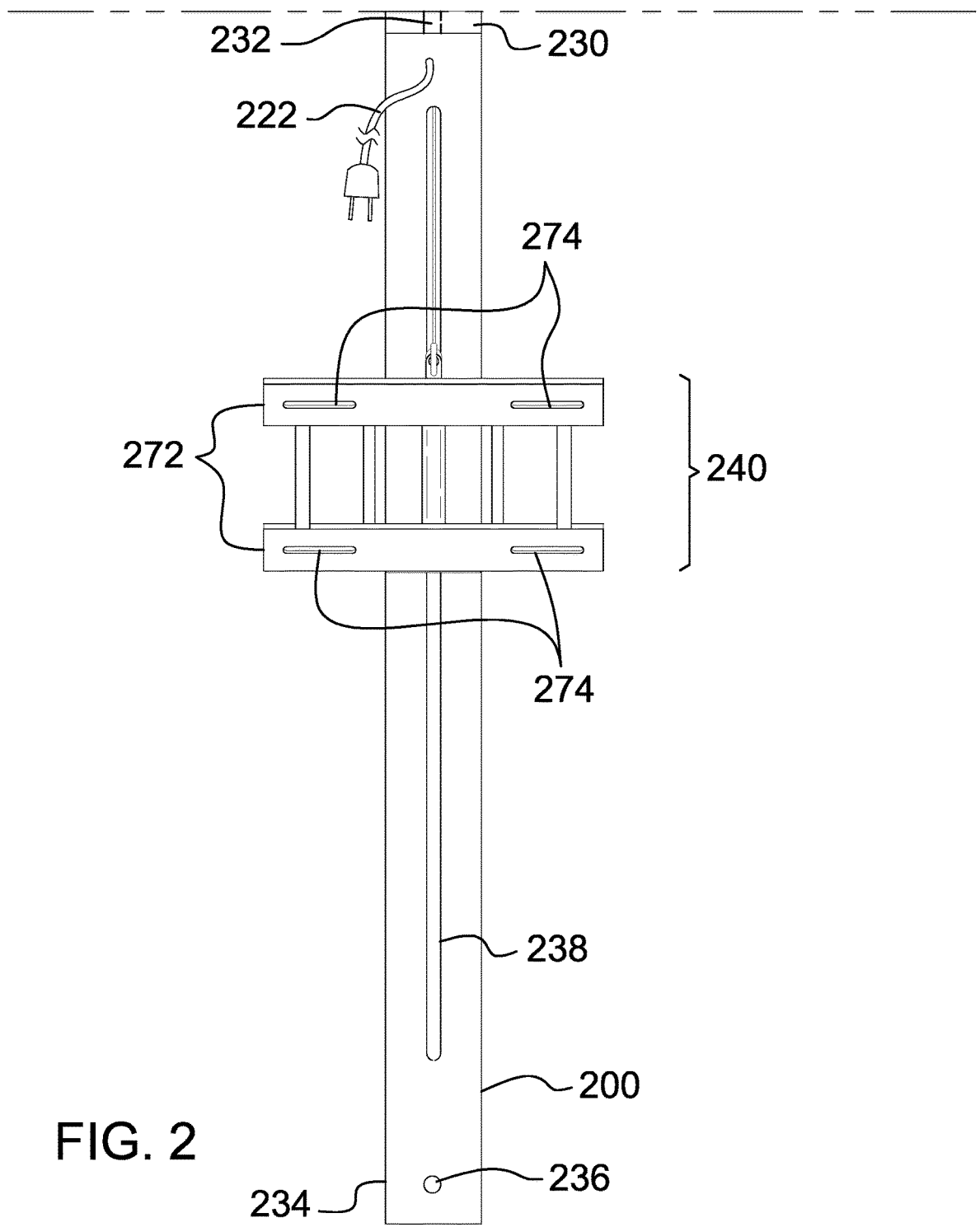
FIG. 2 is a front view of an embodiment of the disclosure.
Figure 3:
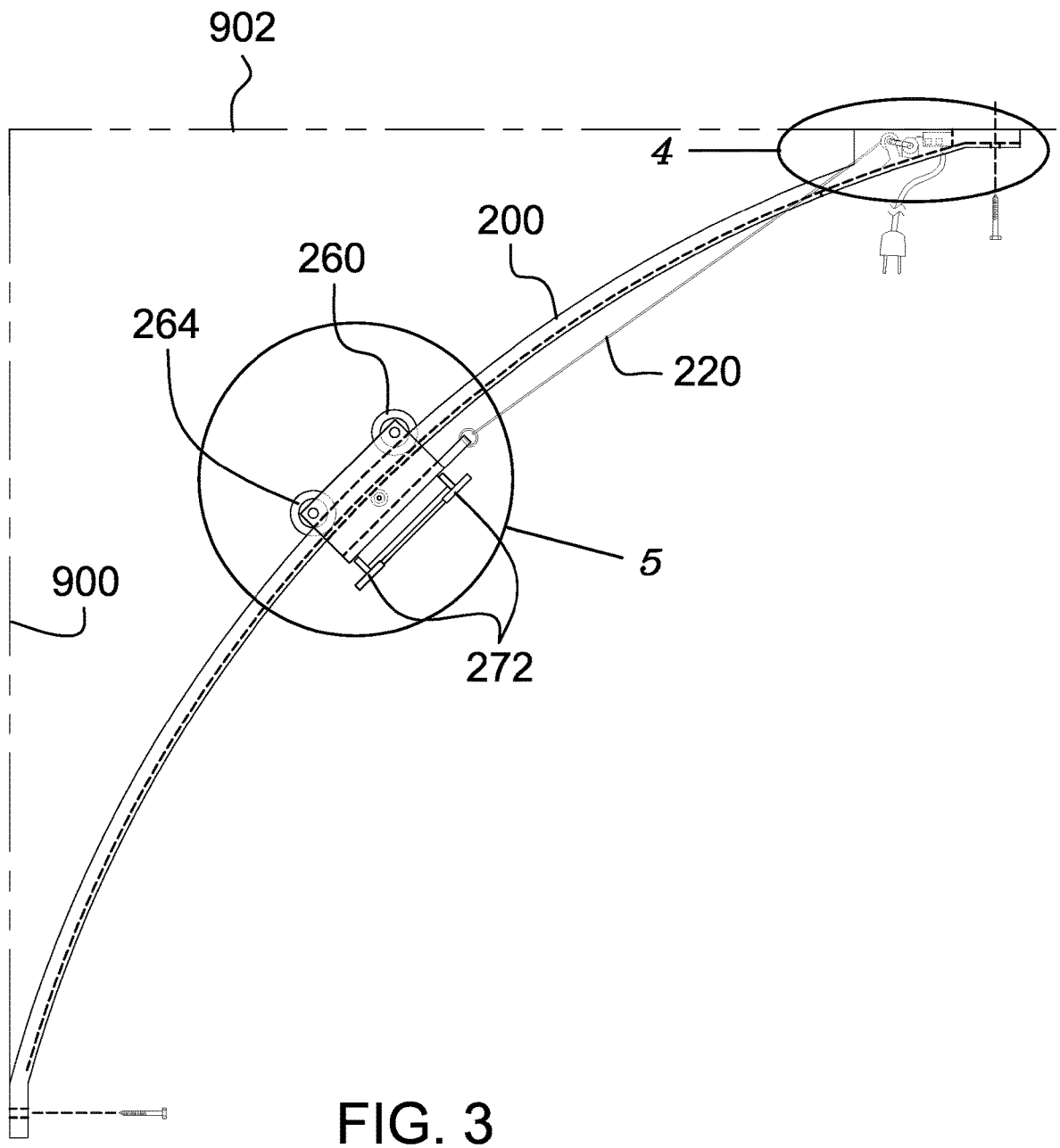
FIG. 3 is a side view of an embodiment of the disclosure.
Figure 4:
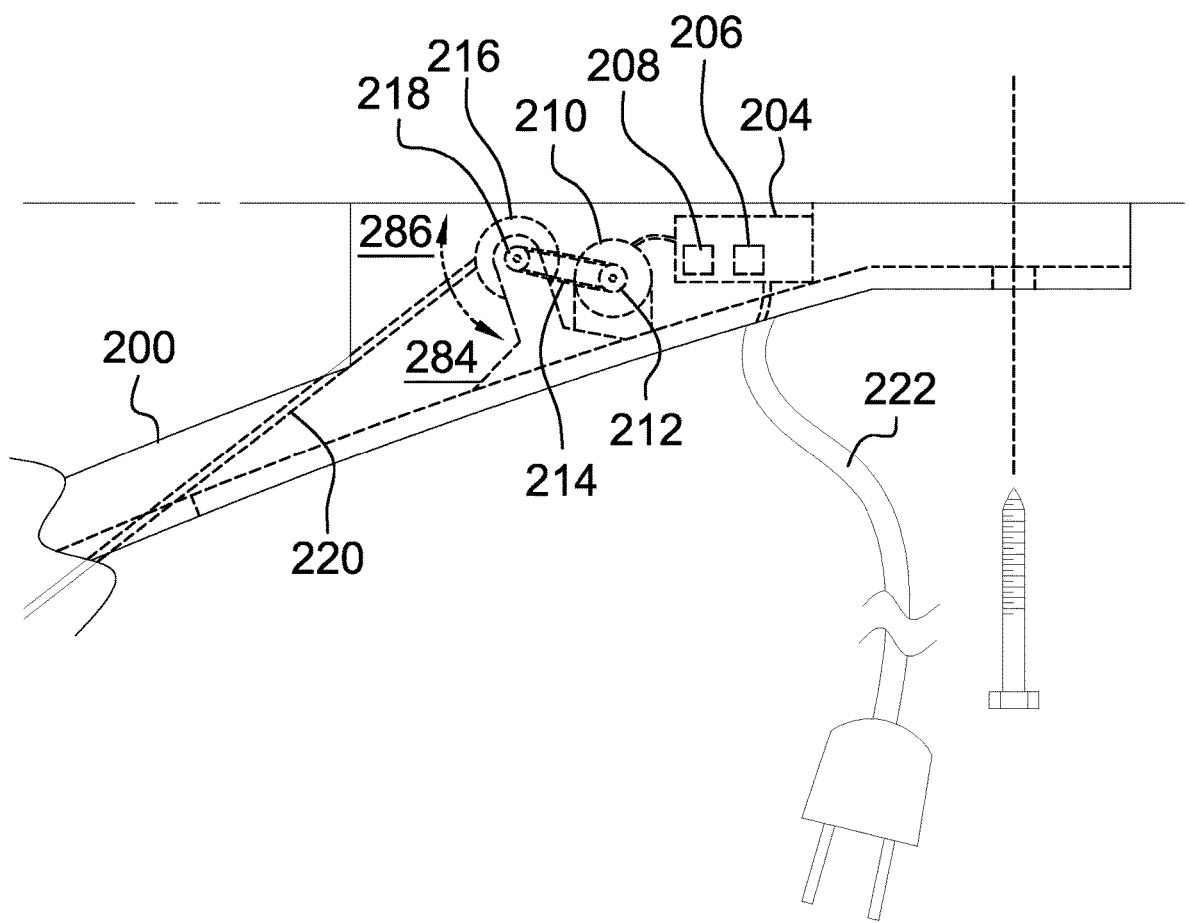
FIG. 4 is a detail view of an embodiment of the disclosure illustrating the area marked 4 as shown in FIG. 3.
Figure 5:
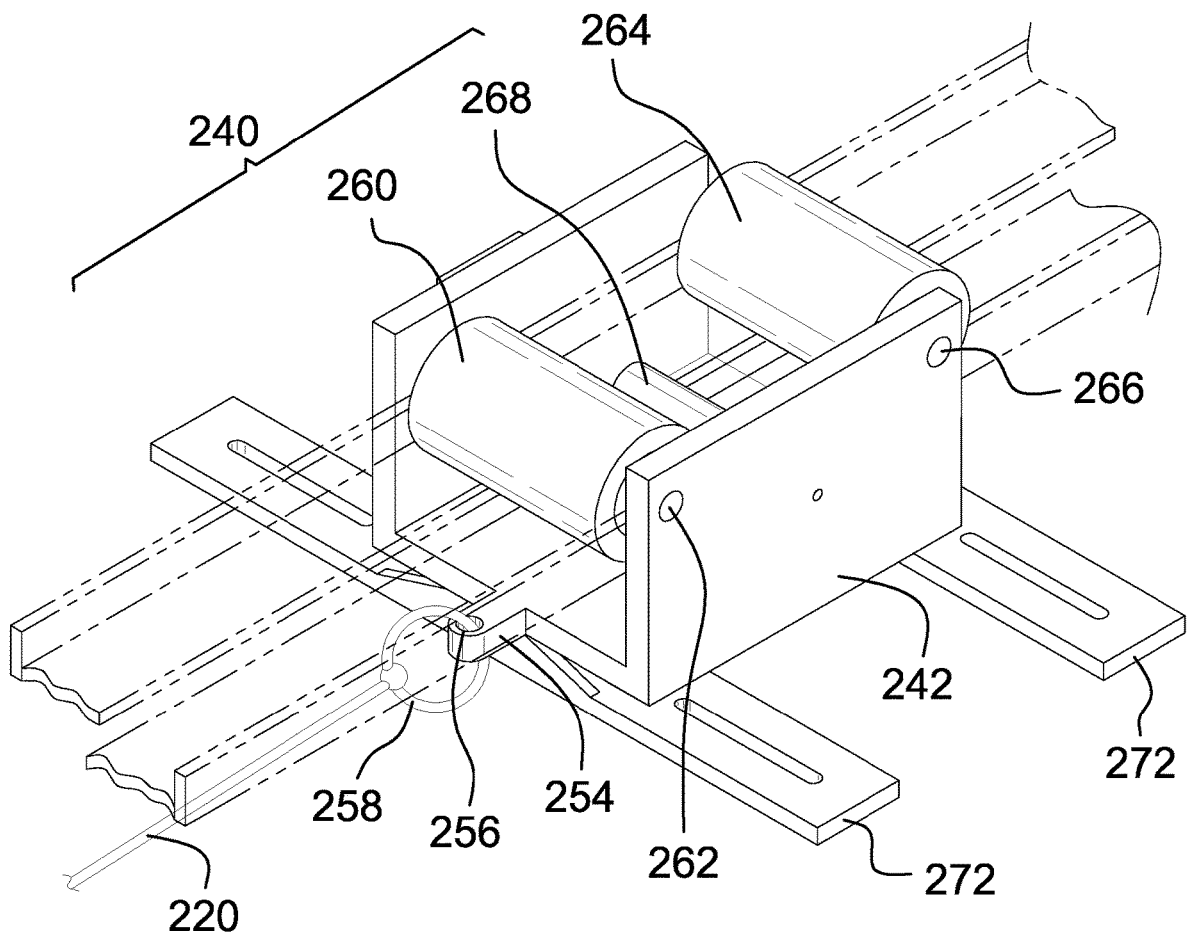
FIG. 5 is a detail view of an embodiment of the disclosure illustrating the area marked 5 as shown in FIG. 3.
Figure 6:
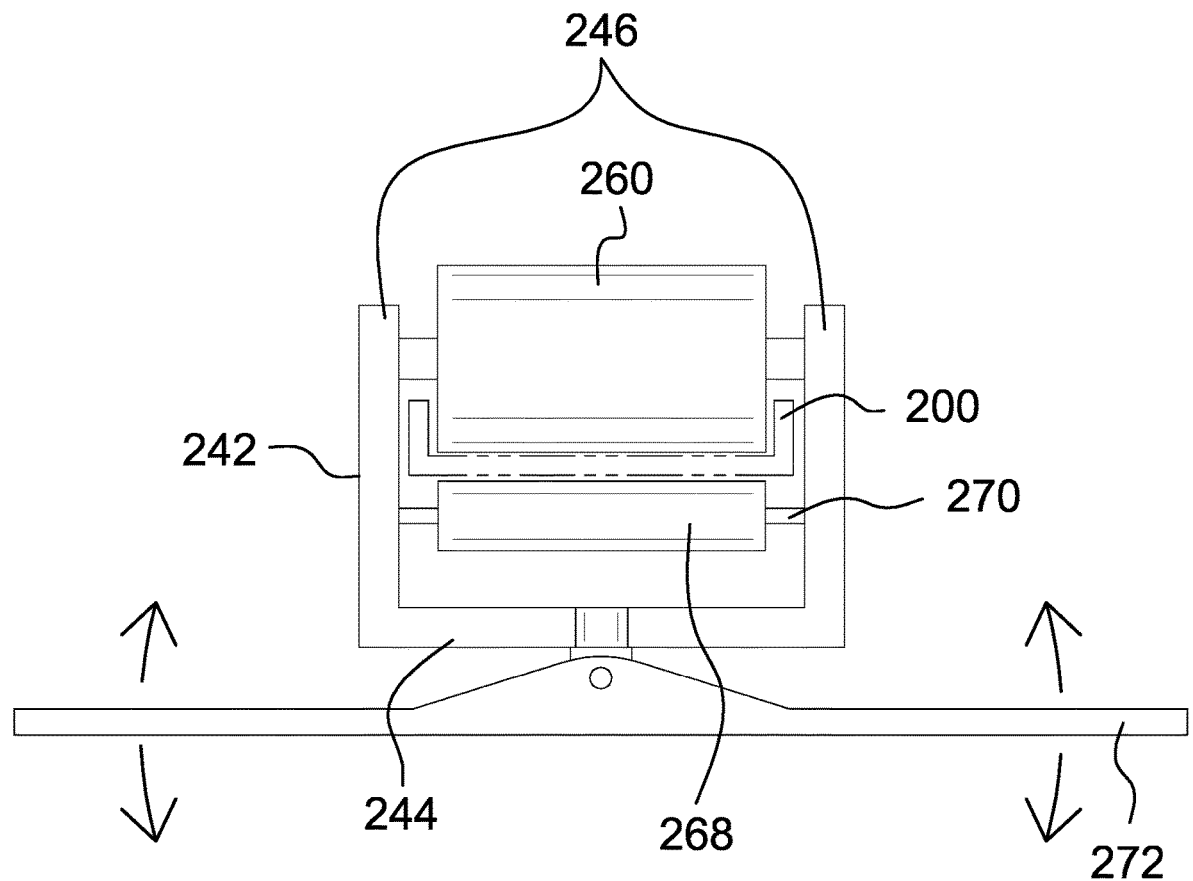
FIG. 6 is a top detail view of an embodiment of the disclosure illustrating the roller car.
Figure 7:
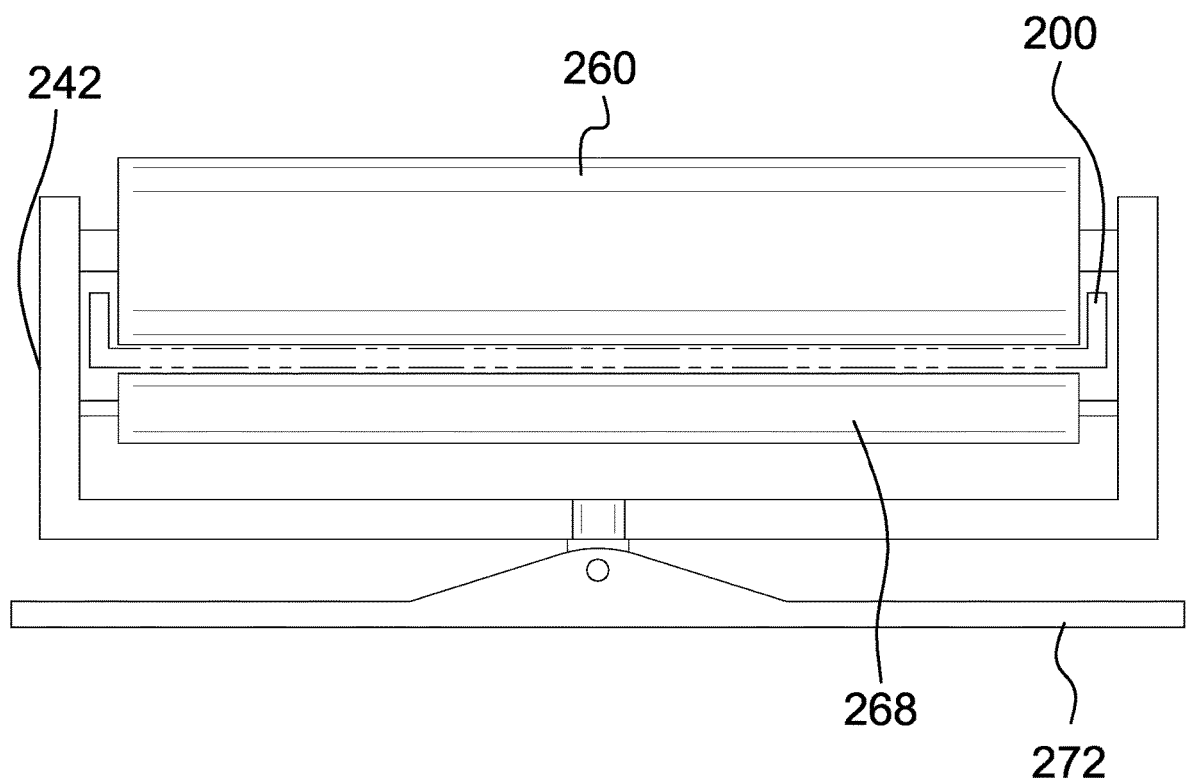
FIG. 7 is a top detail view of a second embodiment of the disclosure illustrating the roller car and track widened to support a larger flat screen display.

Detailed reference will now be made to a first potential embodiment of the disclosure, which is illustrated in FIGS. 1 through 7.

The adjustable display track system 100 (hereinafter invention) comprises a track 200 and a roller car 240. The invention 100 may be adapted to move a flat screen display 910 that is coupled to the roller car 240 along the track 200 between a lowered position 296 and a raised position 294. The invention 100 may be adapted to lower an elevation angle 288 of the flat screen display 910 as the roller car 240 is raised such that the flat screen display 910 continues to point towards a user. Motion of the roller car 240 may be controlled remotely from a smart device 920.

The track 200 may guide the movement of the roller car 240. The track 200 may be inclined between a wall 900 and a ceiling 902. The track 200 may form a concave curve as viewed from the front such that the track 200 bends towards the joint comprise an upper mounting flange 230 with an upper mounting aperture 232 at the top end of the track 200 and a lower mounting flange 234 with a lower mounting aperture 236 at the bottom end of the track 200. The upper mounting flange 230 may be mounted to the ceiling 902 and the lower mounting flange 234 may be mounted to the wall 900 using a mounting hardware through the upper mounting aperture 232 into the ceiling 902 and through the lower mounting aperture 236 into the wall 900. As a non-limiting example, the mounting hardware may be a lag bolts. The track 200 may have a U-shaped cross section. The track 200 may comprise a longitudinal aperture 238 that runs longitudinally along the center of the track 200. The longitudinal aperture 238 may permit a lifting cable 220 to reach the roller car 240 from within an equipment housing 202 of the track 200.

The track 200 may comprise the equipment housing 202. The equipment housing 202 may cover a controller 204, a motor 210, and a cable spool 216. The equipment housing 202 may be adapted to approve the appearance of the invention 100, to prevent injuries resulting from touching moving parts, and to protect the controller 204 from damage.

The controller 204 may comprise a microcontroller 206 and a wireless communication interface 208. The microcontroller 206 may be a computer comprising a processor, one or more memory subsystems, and input/output ports. In embodiments, the processor, the one or more memory subsystems, the input/output ports, or combinations thereof may be packaged together or separately. The wireless communication interface 208 may be operable to send messages to and/or receive messages from the smart device 920 via a wireless communication link 298. As a non-limiting example, the wireless communication link 298 may be a Bluetooth® link.

The microcontroller 206 may be coupled to the wireless communication interface 208 via the input/output ports. Responsive to receiving the messages from the smart device 920 via the wireless communication interface 208, the controller 204 may energize or de-energize the motor 210 to move the roller car 240 in accordance with instructions programmed into the controller 204 and stored within the one or more memory subsystems of the microcontroller 206.

The motor 210 may convert electrical energy into mechanical energy. The motor 210 may cause rotation of a motor pulley 212 when electrical energy is applied to the motor 210. The motor 210 may be energized by applying an electrical potential. The rotational direction of the motor 210 may be determined by the polarity of the electrical potential that is applied to energize the motor 210. Rotation of the motor pulley 212 may be conveyed to a spool pulley 218 via a belt 214.

The cable spool 216 may be a reel for holding the lifting cable 220. The top end of the lifting cable 220 may be coupled to the cable spool 216. The bottom end of the lifting cable 220 may be coupled to the roller car 240. In some embodiments, the lifting cable 220 may be stranded aircraft cable.

The spool pulley 218 may be coupled to the cable spool 216 such that rotation of the spool pulley 218 may cause rotation of the cable spool 216. As the motor 210 turns in a first rotational direction 284, the lifting cable 220 may wind onto the cable spool 216 thus pulling the roller car 240 in an upward direction 290 towards the equipment housing 202 located at the top of the track 200. As the motor 210 turns in a second rotational direction 286, the lifting cable 220 may unwind from the cable spool 216 and may be pulled off of the cable spool 216 by the weight of the roller car 240 thus moving the roller car 240 in a downward direction 292.

The equipment housing 202 may further comprise a power cable 222. The power cable 222 may provide power to operate the controller 204 and the motor 210. As a non-limiting example, the power cable 222 may plug into an electrical outlet 912. The upper mounting flange 230 may comprise the upper mounting aperture 232. The lower mounting flange 234 may comprise the lower mounting aperture 236.

The roller car 240 may be operable to move the flat screen display 910 along the track 200 under control of the smart device 920. The roller car 240 may comprise a frame 242, an upper roller 260, a lower roller 264, a retaining roller 268, and one or more display mounting brackets 272.

The frame 242 may have a generally U-shaped cross-section. The frame 242 may comprise a front plate 244 in front of the track 200 and two side plates 246 extending perpendicularly from the sides of the front plate 244 to the rear. The two side plates 246 may extend past the track 200 such that the upper roller 260 and the lower roller 264 may be coupled between the two side plates 246 and may press against the rear of the track 200.

The frame 242 may comprise a cable attachment point 254 such that the lifting cable 220 may be coupled to the frame 242 by passing the lifting cable 220 directly through an attachment aperture 256 of the cable attachment point 254 or by passing a ring 258 through the attachment aperture 256 and coupling the lifting cable 220 to the ring 258.

The upper roller 260 may be rotationally coupled between the two side plates 246 via an upper roller axle 262. The lower roller 264 may be rotationally coupled between the two side plates 246 via a lower roller axle 266. The retaining roller 268 may be rotationally coupled between the two side plates 246 via a retaining roller axle 270.

The upper roller 260 may be coupled to the top rear of the two side plates 246. The lower roller 264 may be coupled to the lower rear of the two side plates 246. The upper roller 260 and the lower roller 264 press against the rear side of the track 200. The retaining roller 268 may be coupled to the middle front of the two side plates 246 such that the retaining roller 268 presses against the front side of the track 200.

The one or more display mounting brackets 272 may be pivotably coupled to the top and bottom of the frame 242. The one or more display mounting brackets 272 may be adapted to couple to the flat screen display 910 via one or more display mounting apertures 274 and may be operable to pivot the viewing angle of the flat screen display 910 from side to side.

In use, the track 200 may be mounted between the ceiling 902 and the wall 900 using the mounting hardware at the upper mounting flange 230 and the lower mounting flange 234. The flat screen display 910 may be coupled to the one or more display mounting brackets 272 on the roller car 240. The user may select the horizontal viewing angle by pivoting the flat screen display 910 and the one or more display mounting brackets 272 from side to side. The user may raise and lower the flat screen display 910 from their smart device by sending messages from the smart device 920 via the wireless communication link 298. Responsive to the messages, the controller 204 may activate the motor 210 or may deactivate the motor 210. The polarity of the electrical potential when the motor 210 is activated may determine whether the roller car 240 moves in the upward direction 290 or the downward direction 292.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "aircraft cable" may refer to wire rope made of galvanized or stainless steel and having a diameter between 0.047 inches to 0.375 inches. Aircraft cable may be constructed of 7 strands twisted together where each strand comprises 7 or 19 individual wires that are also twisted together.

As used in this disclosure, an "aperture" may be an opening in a surface. Aperture may be synonymous with hole, slit, crack, gap, slot, or opening.

As used in this disclosure, an "axle" may be a cylindrical shaft that is inserted through the center of an object such that the center axis of the object and the center axis of the axle are aligned and the object can rotate using the axle as an axis of rotation.

As used in this disclosure, "Bluetooth" may refer to a standardized communication protocol that is used to wirelessly interconnect electronic devices. Bluetooth® is a registered trademark of Bluetooth SIG.

As used in this disclosure, "concave" may be used to describe a surface that resembles the interior surface of a sphere or a portion thereof.

As used herein, the words "couple", "couples", "coupled" or "coupling", may refer to connecting, either directly or indirectly, and does not necessarily imply a mechanical connection.

As used in this disclosure, a "cross-section" may be a surface or shape that would be exposed by making a straight cut through an object.

As used herein, "elevation angle" may refer to the angle between a line and the horizon.

As used herein, "energize" and/or "energization" may refer to the application of an electrical potential to a system or subsystem.

As used in this disclosure, a "flange" may be a protruding rib, edge, or collar that is used to hold an object in place or to attach a first object to a second object.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used herein, the word "longitudinal" or "longitudinally" may refer to a lengthwise or longest direction.

As used in this disclosure, a "microcontroller" may be a small computer, often on a single integrated circuit, containing a processor core, memory, and programmable input/output peripherals.

As used in this disclosure, a "motor" may refer to a device that transforms energy from an external power source into mechanical energy.

As used herein, "mounting hardware" may refer to mechanical devices that are used to attach one object to another, including devices whose only purpose is to improve aesthetics. As non-limiting examples, mounting hardware may include screws, nuts, bolts, washers, rivets, crossbars, hooks, collars, nipples, standoffs, knobs, caps, plates, rails, lips, and brackets.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used in this disclosure, a "plate" may be a flat, rigid object having at least one dimension that is of uniform thickness and is thinner than the other dimensions of the object. Plates often have a rectangular or disk like appearance. Plates may be made of any material, but are commonly made of metal.

As used herein, the terms "processor", "central processor", "central processing unit", "CPU", or "microprocessor" may refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure a "pulley" may be a wheel with a grooved rim around which a cord (or other form of rope, line, belt, or cable) passes. The pulley may be used to change the direction of a force applied to the cord. In some embodiments, pulleys may be used in groups of two or more to convey a force from one pulley to all other pulleys in the group via a belt.

As used herein, "smart device" may refer to a portable electrical device comprising at least a processor, display, input device, and network connection. The input device is generally a touch screen, keyboard, or voice recognition. The network connection is generally wireless. Non-limiting examples of smart devices may include smartphones, tablets, personal digital assistants, laptop computers, and smartwatches.

As used herein, "spool" may refer to a cylindrical device upon which a flexible material, including but not limited to a rope, a cable, a yarn, a cord, a sheet of fabric, or a tape, can be wound. Depending on context, a spool may also comprise the flexible material stored upon the spool.

As used in this disclosure, a "track" may be a device that is used to control the path of motion of an object in at least one dimension.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An adjustable display track system comprising:
a track and a roller car;
wherein the adjustable display track system is adapted to move a flat screen display that is coupled to the roller car along the track between a lowered position and a raised position;

wherein the adjustable display track system is adapted to lower an elevation angle of the flat screen display as the roller car is raised such that the flat screen display continues to point towards a user;

wherein motion of the roller car is controlled remotely;

wherein the track guides the movement of the roller car;

wherein the track is configured to be inclined between a wall and a ceiling;

wherein the track forms a concave curve such that the track is configured to bend towards a joint formed by the wall and the ceiling wherein the track comprises an upper mounting flange with an upper mounting aperture at a top end of the track and a lower mounting flange with a lower mounting aperture at a bottom end of the track;

wherein the upper mounting flange is configured to be mounted to the ceiling and the lower mounting flange is configured to be mounted to the wall using a mounting hardware through the upper mounting aperture into the ceiling and through the lower mounting aperture into the wall;

wherein the track has a U-shaped cross section.

2. The adjustable display track system according to claim 1 wherein the track comprises a longitudinal aperture that runs longitudinally along a center of the track;

wherein the longitudinal aperture permits a lifting cable to reach the roller car from within an equipment housing of the track.

3. The adjustable display track system according to claim 2 wherein the track comprises the equipment housing;

wherein the equipment housing covers a controller, a motor, and a cable spool;

wherein the equipment housing is adapted to improve an appearance of the adjustable display track system, to prevent injuries resulting from touching moving parts, and to protect the controller from damage.

4. The adjustable display track system according to claim 3 wherein the controller comprises a microcontroller and a wireless communication interface;

wherein the microcontroller is a computer comprising a processor, one or more memory subsystems, and input/output ports;

wherein the wireless communication interface is operable to send messages to and/or receive messages from a smart device via a wireless communication link.

5. The adjustable display track system according to claim 4 wherein the microcontroller is coupled to the wireless communication interface via the input/output ports;

wherein responsive to receiving the messages from the smart device via the wireless communication interface, the controller energizes or de-energizes the motor to move the roller car in accordance with instructions programmed into the controller.

6. The adjustable display track system according to claim 5 wherein the motor converts electrical energy into mechanical energy;

wherein the motor causes rotation of a motor pulley when electrical energy is applied to the motor;

wherein the motor is energized by applying an electrical potential and is de-energized by removing the electrical potential.

7. The adjustable display track system according to claim 6 wherein a rotational direction of the motor is determined by the polarity of the electrical potential that is applied to energize the motor;

wherein rotation of the motor pulley is conveyed to a spool pulley via a belt.

8. The adjustable display track system according to claim 7 wherein the cable spool is a reel for holding the lifting cable;

wherein a top end of the lifting cable is coupled to the cable spool;

wherein a bottom end of the lifting cable is coupled to the roller car.

9. The adjustable display track system according to claim 8 wherein the lifting cable is stranded aircraft cable.

10. The adjustable display track system according to claim 8 wherein the spool pulley is coupled to the cable spool such that rotation of the spool pulley causes rotation of the cable spool;

wherein as the motor turns in a first rotational direction, the lifting cable winds onto the cable spool thus pulling the roller car in an upward direction towards the equipment housing located at the top of the track;

wherein as the motor turns in a second rotational direction, the lifting cable unwinds from the cable spool and is pulled off of the cable spool by the weight of the roller car thus moving the roller car in a downward direction.

11. The adjustable display track system according to claim 10 wherein the equipment housing further comprises a power cable;

wherein the power cable provide powers to operate the controller and the motor.

12. The adjustable display track system according to claim 11 wherein the roller car is operable to move the flat screen display along the track under control of the smart device;

wherein the roller car comprises a frame, an upper roller, a lower roller, a retaining roller, and one or more display mounting brackets.

13. The adjustable display track system according to claim 12 wherein the frame has a U-shaped cross-section;

wherein the frame comprises a front plate in front of the track and two side plates extending perpendicularly from the sides of the front plate to the rear;

wherein the two side plates extend past the track such that the upper roller and the lower roller are coupled between the two side plates and press against the rear of the track.

14. The adjustable display track system according to claim 13 wherein the frame comprises a cable attachment point such that the lifting cable is coupled to the frame by passing the lifting cable directly through an attachment aperture of the cable attachment point or by passing a ring through the attachment aperture and coupling the lifting cable to the ring.

15. The adjustable display track system according to claim 14 wherein the upper roller is rotationally coupled between the two side plates via an upper roller axle;

wherein the lower roller is rotationally coupled between the two side plates via a lower roller axle;

wherein the retaining roller is rotationally coupled between the two side plates via a retaining roller axle.

16. The adjustable display track system according to claim 15 wherein the upper roller is coupled to a top rear of the two side plates;

wherein the lower roller is coupled to a lower rear of the two side plates;

wherein the upper roller and the lower roller press against the rear side of the track;

wherein the retaining roller is coupled to a middle front of the two side plates such that the retaining roller presses against the front side of the track.

17. The adjustable display track system according to claim 16 wherein the one or more display mounting brackets are pivotably coupled to a top and bottom of the frame;

wherein the one or more display mounting brackets are adapted to couple to the flat screen display via one or more display mounting apertures;

wherein the one or more display mounting brackets are operable to pivot a viewing angle of the flat screen display from side to side.

* * * * *